United States Patent
Jatowt et al.

(10) Patent No.: US 7,584,185 B2
(45) Date of Patent: Sep. 1, 2009

(54) PAGE RE-RANKING SYSTEM AND RE-RANKING PROGRAM TO IMPROVE SEARCH RESULT

(75) Inventors: Adam Jatowt, Kyoto (JP); Yukiko Kawai, Kyoto (JP); Katsumi Tanaka, Kyoto (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 343 days.

(21) Appl. No.: 11/652,723

(22) Filed: Jan. 12, 2007

(65) Prior Publication Data

US 2007/0174279 A1 Jul. 26, 2007

(30) Foreign Application Priority Data

Jan. 13, 2006 (JP) ............................ P2006-006692

(51) Int. Cl.
*G06F 17/30* (2006.01)
(52) U.S. Cl. .................................. 707/5; 707/3; 707/10
(58) Field of Classification Search .................. 707/101, 707/10, 4, 3, 5, 6, 7, 102, 104.1
See application file for complete search history.

(56) References Cited

U.S. PATENT DOCUMENTS

| | | | | |
|---|---|---|---|---|
| 6,397,228 B1 * | 5/2002 | Lamburt et al. | ............. | 707/203 |
| 6,408,294 B1 * | 6/2002 | Getchius et al. | ................ | 707/5 |
| 6,421,683 B1 * | 7/2002 | Lamburt | ................... | 707/104.1 |
| 6,484,161 B1 * | 11/2002 | Chipalkatti et al. | ............ | 707/3 |
| 6,493,721 B1 * | 12/2002 | Getchius et al. | .......... | 707/104.1 |
| 6,496,843 B1 * | 12/2002 | Getchius et al. | ............. | 715/210 |
| 6,643,640 B1 * | 11/2003 | Getchius et al. | ................ | 707/3 |
| 6,826,559 B1 * | 11/2004 | Ponte | ............................ | 707/3 |
| 7,047,242 B1 * | 5/2006 | Ponte | .......................... | 707/10 |
| 7,409,402 B1 * | 8/2008 | Chan et al. | ................... | 707/101 |
| 7,421,441 B1 * | 9/2008 | Chan et al. | ................... | 707/101 |
| 2005/0246321 A1 * | 11/2005 | Mahadevan et al. | ............ | 707/3 |
| 2006/0026147 A1 * | 2/2006 | Cone et al. | ..................... | 707/3 |
| 2006/0136377 A1 * | 6/2006 | Patt-Shamir et al. | ........... | 707/3 |
| 2008/0243838 A1 * | 10/2008 | Scott et al. | ..................... | 707/5 |

OTHER PUBLICATIONS

Srikanth Kallurkar, "A model for decentralized information dissimination", Sep. 14, 2004.*
Taku et al., Boosting-based parse reranking with subtree features, Jun. 2005.*
Donghui et al., Mining and Re-ranking for Answering Biographical Queries on the Web, 2006.*
Heng Ji, et al., Re-Ranking Algorithms for Name Tagging, 2005.*

* cited by examiner

*Primary Examiner*—Jean M Corrielus

(57) ABSTRACT

A page re-ranking system includes a super page producing part that produces a super page where page contents are combined between multiple versions for each of multiple Web pages that can be obtained as a search result page in compliance with a user's query and to which a page ranking is created, a super page analyzing part that analyzes a covering degree of a topic representation that is contained in the super page produced by the super page producing part, and a re-ranking part that grants a renewed page ranking to each of the Web pages by comparing the analysis results obtained by the super page analyzing part between the super pages.

19 Claims, 6 Drawing Sheets

PAGE RE-RANKING SYSTEM AND RE-RANKING PROGRAM TO IMPROVE SEARCH RESULT

BACKGROUND OF THE INVENTION

1. Field of the Invention

This invention relates to a page re-ranking system and a page re-ranking program that grants a renewed page ranking to a Web page that is obtained as a search result page and to which a page ranking is given

2. Description of Related Art

Recently a search service has been known that rapidly extracts and outputs a corrected search result from a flood of information on the Web in compliance with a query. In order to make it possible to utilize the search result more effectively, a technology has been proposed that gives a page ranking as being an evaluation index showing its usability to a Web page obtained as a search result page.

An outline of a technology that creates this kind of a page ranking will be explained.

For example, a link from a Web page A to a Web page B is considered to be a supporting vote to the Web page B by the Web page A and an indication of the importance of the Web page B is judged to be based on the number of the supporting votes. At this time, not only the number of the supporting votes, namely a number of links to the Web page but also the Web page that casts the supporting vote is analyzed. Then the supporting vote cast by a Web page whose "level of importance" is ranked high is more highly evaluated and the Web page that receives the supporting vote is set to be "an important page."

It is so arranged that the important page that receives a high evaluation by this link analysis is also given a high page ranking and its final ranking in the search results becomes high. Examples of this type of re-ranking system can be found at (1) "Google no ninnki no himitsu (Secret of Google's popularity)" http://www.google.co.jp/intl/ja/why_use.html, (2) "Google Searches More Sites More Quickly, Delivering the Most Relevant Results" http://www.google.com/technology/index.html and (3) "Benefits of Google Search" http://www.google.com/technology/whyuse.html.

There is still a need to improve the ability to search for relevant information on the Internet and other large data bases and to prioritize the results:

SUMMARY OF THE INVENTION

With the conventional technology, the search engines can actually affect a user's behavior and the resulting popularity of the Web pages. Since there are huge amounts of resources on the Web, relatively few of them are likely to be found and visited by users seeking specific information. Pages must therefore compete for user attention. Successful pages are the ones that are frequently visited by many users. Unfortunately, the competition between Web pages for user attention is not completely fair or rather unbiased. Since users tend to click only on the top-ranked pages, lower ranked pages have difficulty gaining popularity even if they have high-quality content relevant to a search inquiry. Conversely, the top-ranked pages may maintain their high ranks since they are frequently accessed by many users and consequently receive more new inbound links than pages with lower rankings. The accelerating growth of the Web is resulting in even more pages competing for user attention, making the negative-bias problem more serious. Consequently and figuratively speaking, we are witnessing a "rich-get-richer" phenomenon.

With a conventional search engine service, a page ranking of a Web page becomes high on the condition that the number of links to the Web page is large even though the Web page has not been updated. For example, even though a lower ranked Web page is updated in order to enrich the page content, the page ranking does not rapidly reflect the fact that the Web page is updated. In other words, even though a Web page is updated so as to contain a fresh and important content, a fact that newness or a degree of importance is increased is not reflected on conventional page ranking systems, unless the Web page is a portal site wherein a larger number of people visit and a lot of links are provided.

The present invention germinates from an idea completely different from a view point of the conventional technology. The idea is to make a role of the page ranking of substance by making the page ranking coupled with a content that contributes to the link accumulation based on an observation that a quality of the content of a Web page in the past has a great effect on the link accumulation and the current page ranking of the Web page.

An object of the present claimed invention is to provide a superior page re-ranking system that can produce a super page with which link accumulation is coupled by combining the page contents from multiple past versions of an arbitrary Web page, and makes use of the super page for a combined page re-ranking so as to create a final page ranking system of a high utility value.

A page re-ranking system in accordance with our invention is characterized by a super page producing part or unit that produces a super page, where the page contents are combined between multiple versions from each of multiple Web pages that can be obtained as a search result page in compliance with a user's query and to which a page ranking is granted, a super page analyzing part or unit that analyzes a covering degree of topic representation that is contained in the super page produced by the super page producing part, and a re-ranking part or unit that creates a renewed page ranking for each of the Web pages by comparing the analysis results obtained by the super page analyzing part between each of the resultant super pages.

"Page ranking" here is an evaluation index showing usability of a Web page, and it is utilized to display multiple Web pages obtained in relation with a search phrase contained in a query in a descending order of "evaluation" in case of displaying its URL on a search result page. More specifically, it is possible to easily find a Web page that is important and accurate corresponding to the user's query by the use of this page ranking system.

In addition, the term "Web page" not only indicates an arbitrary Web page that is open on the Internet but also indicates a broad concept including a Web page that is open on a LAN or a Web page that was open in the past. Furthermore, "multiple versions" originally indicates each version in the past, however, it may indicate the latest version (a version that can be displayed at present without making use of a cache). In addition, "page contents are combined" means to combine each Web page so as not to impair at least the content information (information to judge the content of each Web page), and structure information (link information, format information) may be impaired by a combination process. Furthermore, "topic representation" is a representation that describes a query of a topic or that exists as most related to this query by the use of an appropriate method, and the Web pages can be ranked based on how well the page covers this topic representation if this topic representation is identified. In addition, "covering degree" shows how much the super page covers the topic representation.

In accordance with this arrangement, since a super page contains the topic representation that is distributed not only spatially among many existing Web pages but also temporally among previous versions of Web pages, it is possible to make the page ranking substantial coupled with the content contributing to link accumulation by comparing the covering degrees between each of the super pages analyzed by the super page analyzing part and operating the re-ranking part to grant a final renewed page ranking to each of the Web pages in a descending order of the covering degree.

More specifically, it is possible to provide a superior page re-ranking system that can grant a final page ranking of a high usability.

As a preferable embodiment of the covering degree of the topic representation that is contained in the super page, a similarity degree or a difference degree concerning the topic representation between the super pages can be represented.

It is preferable that the following equation (Equation 1) is used to calculate the similarity degree between the super pages in preparing the final page ranking.

(Equation 1)

$$HR_j = \sum_{i=1}^{W} \left[ \cos(VS_i, VS_j) * \left(1 + \varepsilon * \frac{W - R_i^{SE}}{W}\right) * \left(1 + \kappa * \frac{1}{Age_i}\right) \right] \quad (1)$$

where $HR_j$ is the historical similarity degree of the page j, cos means the cosine similarity, $VS_i$ is the vector of the super page of the page i, $VS_j$ is the vector of the super page of the page j, $R_i^{SE}$ is the search engine ranking of the page i, $\varepsilon$ and $\kappa$ are parameters, W is the total number of URLs as being an object to be re-ranked among the number of URLs of the search result obtained from the search engine, and $Age_i$ is the age of the page i. Here, parameter $\varepsilon$ determines the extent to which the original search engine ranking is used in the historical similarity degree computation. It takes values between 0 and 1. It can be set to 0 or to the value close to 0 by default. Parameter $\kappa$ determines the extent to which the age of pages is considered in the historical similarity degree computation. It takes values between 0 and 1. It can be set to 1 or to the value close to 1 by default. These parameters are set by the user or by the system operator, hence, they are not automatically estimated by the system.

In order to make it possible to grant a page ranking of a higher usability, it is preferable that a current page analyzing part that analyzes a covering degree of topic representation contained in a current Web page is comprised, and the re-ranking part grants a renewed page ranking to each of the Web pages by comparing the analysis results obtained by the current page analyzing part between the current Web pages.

As a preferable embodiment of the covering degree of the topic representation that is contained in the current Web page, a similarity degree or a difference degree concerning the topic representation between the current Web pages can be represented.

Especially it is preferable that the following equation (Equation 2) is used to calculate the similarity degree between the current Web pages.

(Equation 2)

$$CR_j = \sum_{i=1}^{W} \left[ \cos(V_i, V_j) * \left(1 + \varepsilon * \frac{W - R_i^{SE}}{W}\right) \right] \quad (2)$$

where $CR_j$ is the current similarity degree of the page j, $V_i$ is the vector of the page i, $V_j$ is the vector of the page j, $R_i^{SE}$ is the search engine ranking of the page i, $\varepsilon$ is the parameter, W is the total number of URLs as being an object to be re-ranked among the number of URLs of the search result obtained from the search engine. Here, parameter $\varepsilon$ determines the extent to which the original search engine ranking is used in the current similarity degree computation. It takes values between 0 and 1. It can be set to 0 or to the value close to 0 by default. The parameter is set by the user or by the system operator, hence, it is not automatically estimated by the system.

In order to improve the accuracy of re-ranking with an attempt to provide a reduction of cost by making use of a general-purpose system, it is preferable that the super page producing part produces each super page by referring to a Web archive part that memorizes Web pages of multiple versions that existed on the Internet in the past.

In order to attempt reduction of cost by making use of a general-purpose system, it is preferable that the search result page is obtained through a search process by the use of a Web search engine.

As mentioned above, in accordance with the page re-ranking system of this invention, since the page re-ranking system is so arranged that each super page contains the topic representation that is distributed not only spatially among many existing Web pages but also temporally among previous versions of Web pages, it is possible for the page re-ranking system to make the page ranking substantial coupled with the content contributing to link accumulation by comparing the covering degrees between each of the super pages analyzed by the super page analyzing part and operating the re-ranking part to provide a final super page renewed page ranking to each of the Web pages in a descending order of the covering degree.

More specifically, it is possible to provide the superior page re-ranking system that can grant a final page ranking of a high utility value.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

A page re-ranking system P as being one embodiment of the present claimed invention will be described with reference to the accompanying drawings.

Figure 1:
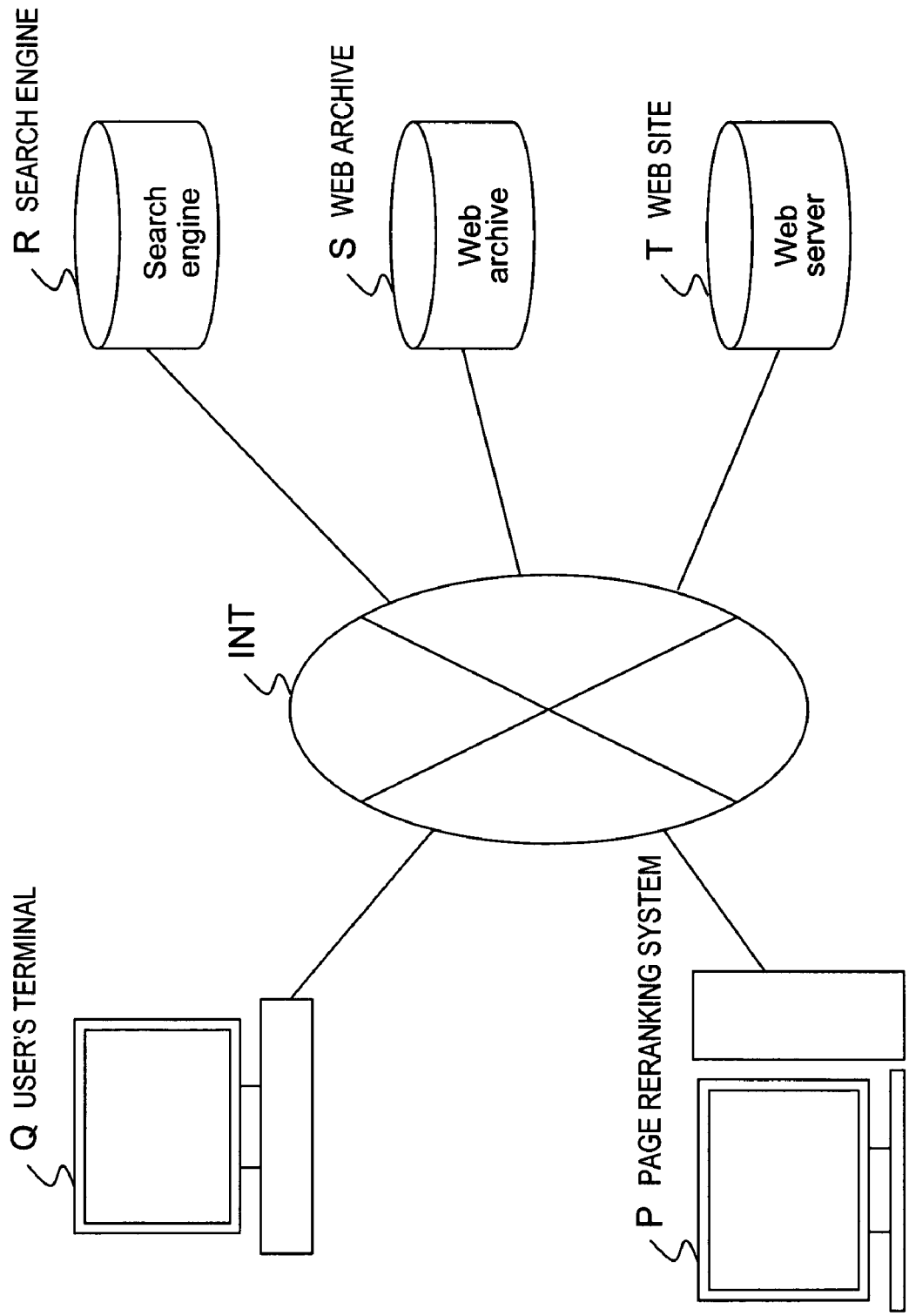
FIG. 1 is an overall view showing a system by the use of a page re-ranking system that can grant a page ranking of a high utility value.

The page re-ranking system P in accordance with this embodiment is so arranged to grant a renewed page ranking of a high utility value to each of multiple Web pages that is obtained as a search result page and to which a page ranking is granted. As shown in FIG. 1, the page re-ranking system P is connected in a mutually communicable manner to a user's terminal Q such as a personal computer provided at a user's side, a search engine R (corresponds to "a Web search engine" in this invention), a Web archive S (corresponds to "a Web archive part" in this invention), and a Web site T through a predetermined communication line net such as the Internet INT. In this embodiment, the page re-ranking system P and the user's terminal Q are separately provided, however, they may be integrally formed. In addition, the same also applies to other devices. The search engine R is a Web site where information that is open on the Internet INT can be searched by the use of a keyword, and a full text search type is used in this embodiment. The kind of the search engine R is not limited to this. In addition, the Web archive S is a Web site where the Web page that existed on the Internet in the past is memorized in association with version administrating information such as year-month-day that can administrate the version of the Web page, and a Web site generally called as "an Internet archive" is made use of in this embodiment.

Next, the page re-ranking system P will be concretely explained.

Figure 2:
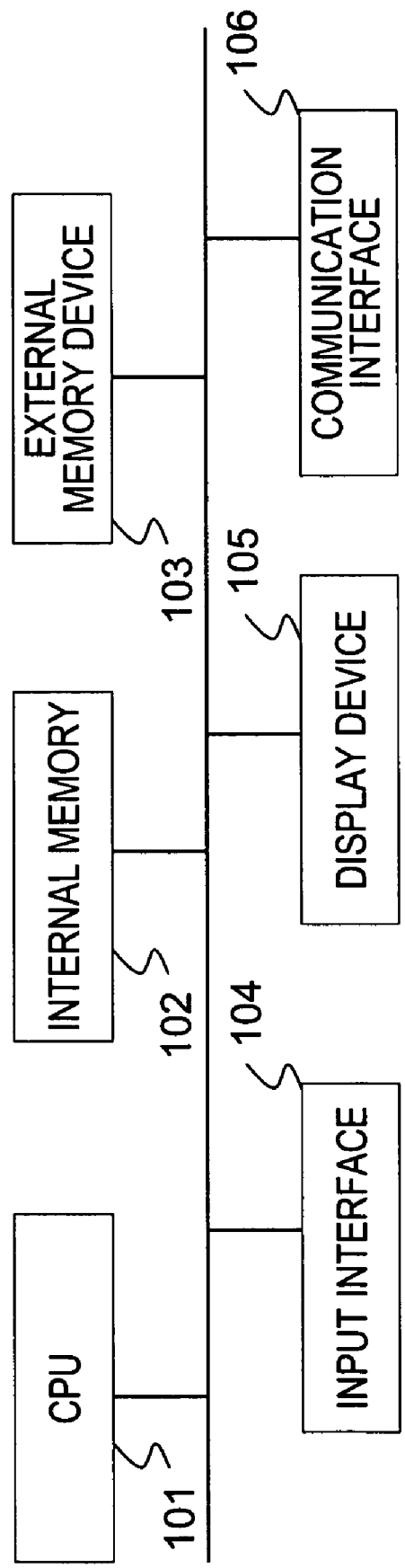
FIG. 2 is a configuration diagram of the page re-ranking system in accordance with this embodiment.

The page re-ranking system P is provided with a general information processing function, and as shown in FIG. 2, comprises a CPU 101, an internal memory 102, an external memory 103 such as an HDD, an input interface 104 such as a mouse or a keyboard, a display device 105 such as a liquid-crystal display and a communication interface 106 to be connected with a communication line net such as an in-house LAN or the Internet.

Figure 3:
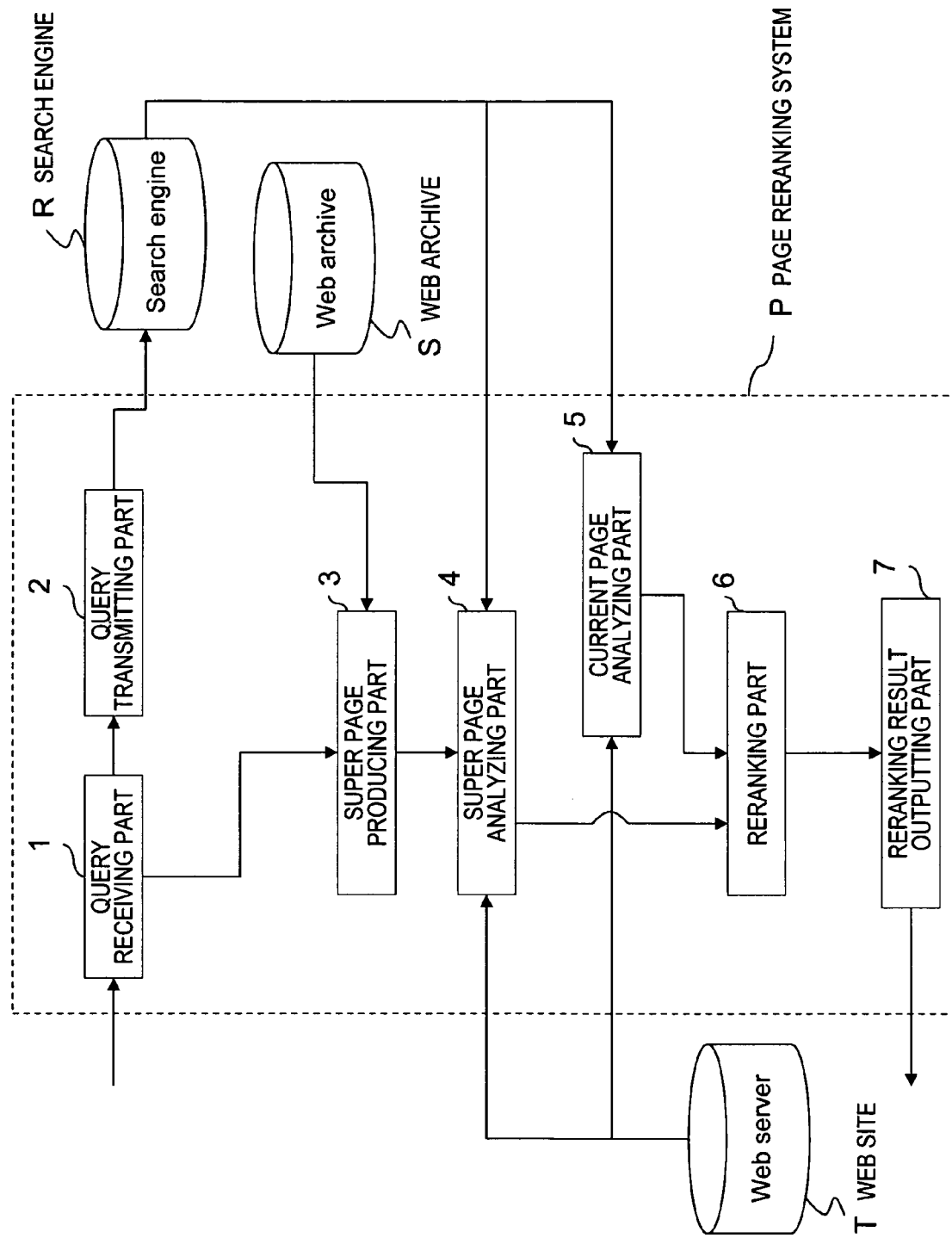
FIG. 3 is a configuration diagram of the page re-ranking system in accordance with this embodiment.

The page re-ranking system P operates the CPU 101 and its peripheral devices in accordance with a page re-ranking program memorized in the internal memory 102 and as shown in FIG. 3, produces functions as a query receiving part 1, a query transmitting part 2, a super page producing part 3, a super page analyzing part 4, a current page analyzing part 5, a re-ranking part 6, and a re-ranking result outputting part 7. Each device will be explained as follows.

The query receiving part 1 receives a query transmitted from the user's terminal Q and makes use of the communication interface 106.

The query transmitting part 2 transmits the query received by the query receiving part 1 to the search engine R and makes use of the communication interface 106.

The super page producing part 3 refers to the Web archive S, and produces a super page where the page contents are combined between multiple versions of each of multiple Web pages that can be obtained as a search result page in compliance with a user's query and to which a page ranking is granted.

Figure 4:
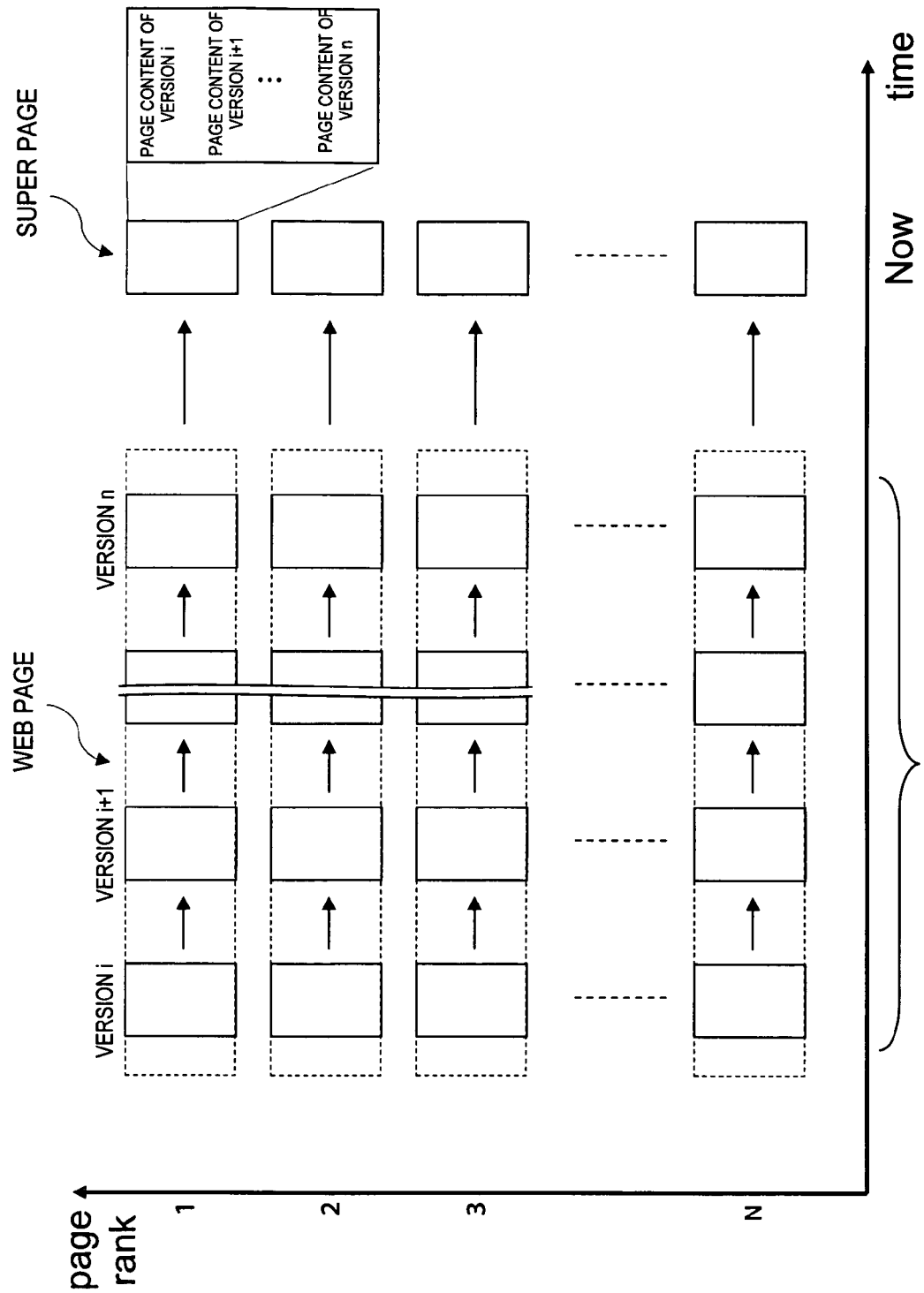
FIG. 4 is a view showing the way to create super pages in accordance with this embodiment.

In this embodiment, as shown in FIG. 4, each of the super pages is produced by simply combining each of the Web pages in an order of the version of the Web page.

Each of the super pages have a vector representation calculated by using normalized TF*IDF weighting of the collection of super-pages of some number of top-ranked pages. Terms in the vector are stemmed and filtered using a stop word list. Because the more static content will be contained in many consecutive page versions, it is repeated more often on the super page. Its importance is thus increased, and it has more impact on the super-page vectors.

The super page analyzing part 4 analyzes a covering degree of topic representation that is contained in the super page produced by the super page producing part 3. In this embodiment, the covering degree analyzed by the super page analyzing part 4 is calculated as a similarity degree in accordance with the topic representation between the super pages by the following equation.

(Equation 1)

$$HR_j = \sum_{i=1}^{W} \left[ \cos(VS_i, VS_j) * \left(1 + \varepsilon * \frac{W - R_i^{SE}}{W}\right) * \left(1 + \kappa * \frac{1}{Age_i}\right) \right] \quad (1)$$

Where $HR_j$ is the historical similarity degree of the page j, cos means the cosine similarity, $VS_i$ is the vector of the super page of the page i, $VS_j$ is the vector of the super page of the page j, $R_i^{SE}$ is the search engine ranking of the page i, $\varepsilon$ and $\kappa$ are parameters, W is the total number of URLs as being an object to be re-ranked among the number of URLs of the search result obtained from the search engine, and $Age_i$ is the age of the page i. Here, parameter $\varepsilon$ determines the extent to which the original search engine ranking is used in the historical similarity degree computation. It takes values between 0 and 1. It can be set to 0 or to the value close to 0 by default. Parameter $\kappa$ determines the extent to which the age of pages is considered in the historical similarity degree computation. It takes values between 0 and 1. It can be set to 1 or to the value close to 1 by default. These parameters are set by the user or by the system operator, hence, they are not automatically estimated by the system.

The current page analyzing part 5 analyzes the covering degree of the topic representation contained in the current Web page. In this embodiment, the covering degree analyzed by the current page analyzing part 5 is calculated as the similarity degree in accordance with the topic representation between the current Web pages by the following equation.

(Equation 2)

$$CR_j = \sum_{i=1}^{W} \left[ \cos(V_i, V_j) * \left(1 + \varepsilon * \frac{W - R_i^{SE}}{W}\right) \right] \quad (2)$$

Where $CR_j$ is the current similarity degree of the page j, $V_i$ is the vector of the page i, $V_j$ is the vector of the page j, $R_i^{SE}$ is the search engine ranking of the page i, $\varepsilon$ is a parameter, W is the total number of URLs as being an object to be re-ranked among the number of URLs of the search result obtained from the search engine. Here, parameter $\varepsilon$ determines the extent to which the original search engine ranking is used in the current similarity degree computation. It takes values between 0 and 1. It can be set to 0 or to the value close to 0 by default. The parameter is set by the user or by the system operator, hence, it is not automatically estimated by the system.

The re-ranking part 6 grants the renewed page ranking to each of the Web pages based on the analysis result obtained by the super page analyzing part 4 and the analysis result obtained by the current page analyzing part 5. In this embodiment, the renewed page ranking is calculated by the following equation.

(Equation 3)

$$R_j^{new} = \frac{\alpha * HR_j^{rank} + \beta * CR_j^{rank}}{\alpha + \beta} \quad (3)$$

Where $R_j^{new}$ is the renewed page ranking of the page j. $HR_j^{rank}$ shows the renewed temporal ranking obtained by arranging the historical similarity degree of the page j obtained from the equation (1) in a descending order of the value of the historical similarity degree. $CR_j^{rank}$ shows the renewed temporal ranking obtained by arranging the current similarity degree of the page j obtained from the equation (2) in a descending order of the value of the current similarity degree. Each of $\alpha$ and $\beta$ shows a parameter for weighting. Here, parameters $\alpha$ and $\beta$ determine the extent to which historical similarity and current similarity degrees are used in the renewed page ranking calculation. They take values between 0 and 1. Parameter $\beta$ can be made equal to 1-$\alpha$ and parameter $\alpha$ can be set to the value close to 0.5 by default. These parameters are set by the user or by the system operator, hence, they are not automatically estimated by the system.

The re-ranking result outputting part 7 outputs or transmits the renewed page ranking provided by the re-ranking part 6 to the user's terminal Q and makes use of the communication interface 106. The renewed page ranking is output to be transmitted as a URL list of the Web page, however, it also may be varied arbitrarily in accordance with a subjectively designed output mode.

Next, a performance of the page re-ranking system P of the above arrangement will be explained with reference to a flow chart.

Figure 5:
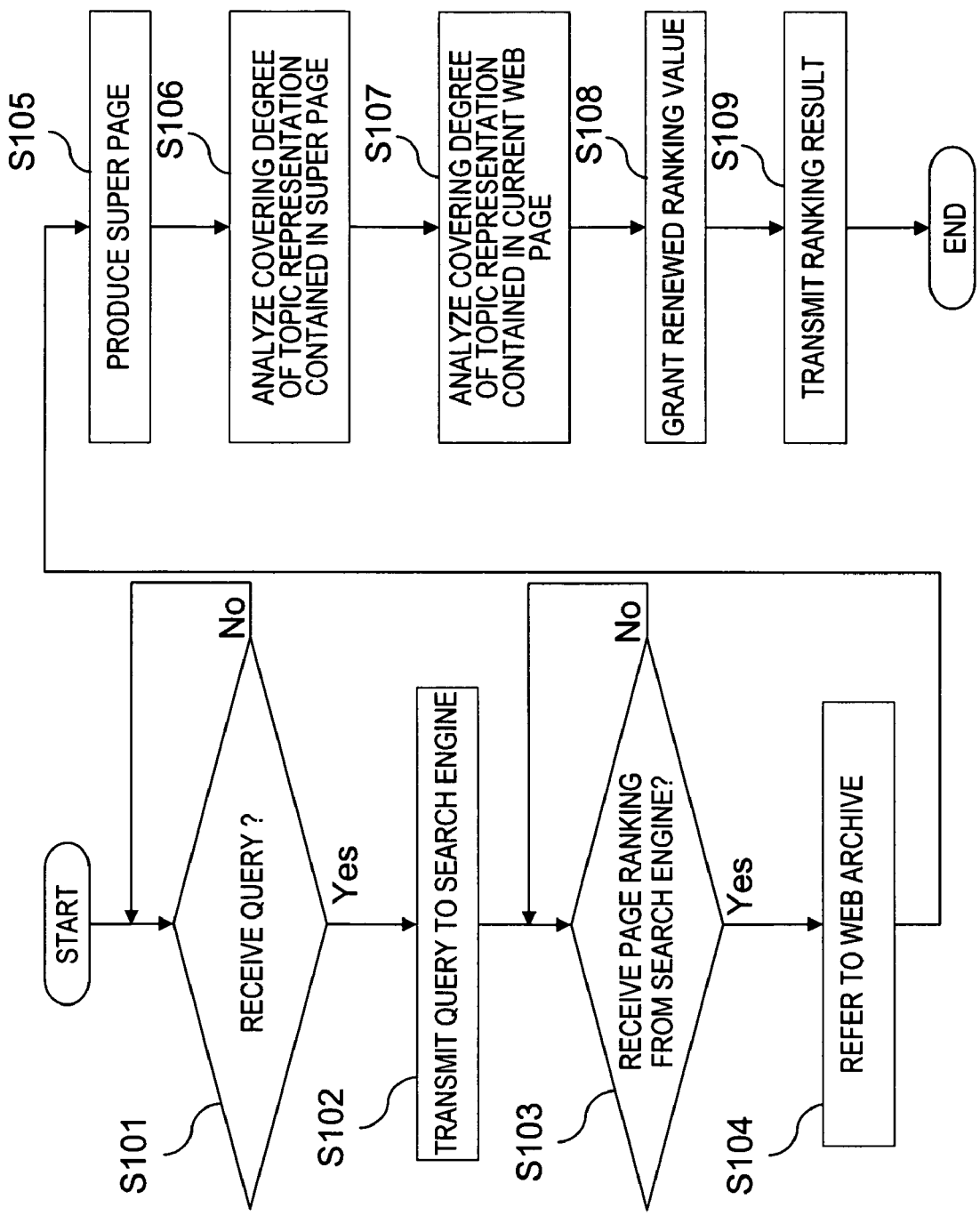
FIG. 5 is a flow chart showing a performance of the page re-ranking system in accordance with this embodiment.

As shown in FIG. 5, first, the query receiving part 1 receives a query transmitted from the user's terminal Q (step S101), and then the query transmitting part 2 transmits the query received by the query receiving part 1 to the search engine R (step S102).

Next, the page ranking is received from the search engine R (step S103), and then the super page producing part 3 refers to the Web archive S (step S104) and produces the super page (step S105). And then, the super page analyzing part 4 analyzes the covering degree of the topic representation contained in the super page produced by the super page producing part 3 (step S106). The covering degree of the topic representation contained in this super page is calculated by the equation (1).

The current page analyzing part 5 analyzes the covering degree of the topic representation contained in the current Web page (step S107). The covering degree of the topic representation contained in this current Web page is calculated by the equation (2).

The re-ranking part 6 grants the renewed page ranking to each of the Web pages based on the analysis result obtained by the super page analyzing part 4 and the analysis result obtained by the current page analyzing part 5 (step S108). The renewed page ranking is calculated by the equation (3).

Then the re-ranking result outputting part 7 outputs the renewed page ranking granted by the re-ranking part 6 to the user's terminal Q (step S109).

As mentioned above, since the page re-ranking system P in accordance with this embodiment is so arranged so that each super page contains the topic representation that is distributed not only spatially among many existing Web pages but also temporally among previous versions of Web pages, it is possible for the page re-ranking system P to make the page ranking substantial coupled with the content contributing to link accumulation by comparing the covering degrees between each of the super pages analyzed by the super page analyzing part 4 and operating the re-ranking part 6 to grant a final renewed page ranking for each of the Web pages in a descending order of the covering degree.

More specifically, it is possible to provide a superior page re-ranking system P that can grant a page ranking of high utility value based on the super pages with which link accumulation is coupled by combining the page contents between the previous multiple versions of the arbitrary Web page.

In addition, since the current page analyzing part 5 that analyzes the covering degree of the topic representation contained in the current Web page and the re-ranking part 6 compares the analysis result obtained by the current page analyzing part 5 between the current Web pages and grants a renewed page ranking to each of the Web pages, it is possible to create a final page ranking of higher utility value.

Furthermore, since the super page producing part 3 refers to the Web archive S that memorizes a Web page having multiple versions that existed on the Internet in the past to produce a super page, it is possible to improve an accuracy of re-ranking by a reduction of cost by making use of an existing general-purpose system.

In addition, since the search result page is obtained by the searching process of the general-purpose search engine R, it is possible to reduce a cost of the system.

This invention is not limited to the above-mentioned embodiment.

For example, each of the Web pages is simply combined in an order of the version of the Web page, however, this method for combining the Web pages is not limited to this version. For example, structure information (link information, format information) may be impaired by a combination process (for example a process to remove stop words or a stemming process) as long as the content information (information to judge the content of each Web page) is not impaired. The content information is the information to judge the content of the page and can be obtained by detecting attribution and incidence from the information in the page based on an attribution dictionary.

The attribution dictionary is a keyword book of the attribution concerning a specific theme. The attribution dictionary is automatically created based on the Web. A method for creating the dictionary is to collect pages concerning a specific theme and to determine a keyword based on a frequency of appearance of the keyword in the collected pages. For example, in case that a certain word appears frequently (for example, appears at a rate of more than or equal to 90%) in each page, the word whose frequency of appearance is high is registered in a dictionary as an attribute name. The incidence is detected based on the number of times a character appears between each of the attributes in each Web page. More concretely, the attribute of each Web page is ranked in an order of appearance, and a number of the characters between the i-th page and the i+1-th page is counted (except for HTML tag) and then the result is detected as the incidences of the attribute i.

In addition, the similarity degree in accordance with the topic representation between the super pages is adopted as the covering degree of the topic representation contained in the super page, however, a difference degree in accordance with the topic representation between the super pages may be adopted.

The similarity degree between the super pages is calculated by the equation (1), however, it need not be limited to this equation.

In addition, the similarity degree in accordance with the topic representation between the current Web pages is used as the covering degree of the topic representation contained in the current Web page, however, a difference degree in accordance with the topic representation between the current Web pages may be used.

In addition, the similarity degree between the current Web pages is calculated by the equation (2), however, it is also not necessarily limited to this equation.

Furthermore, the Web archive S makes use of a Web site generally called as "the Internet archive," however, it is not so limited, if an alternative similar base is available.

Figure 6:
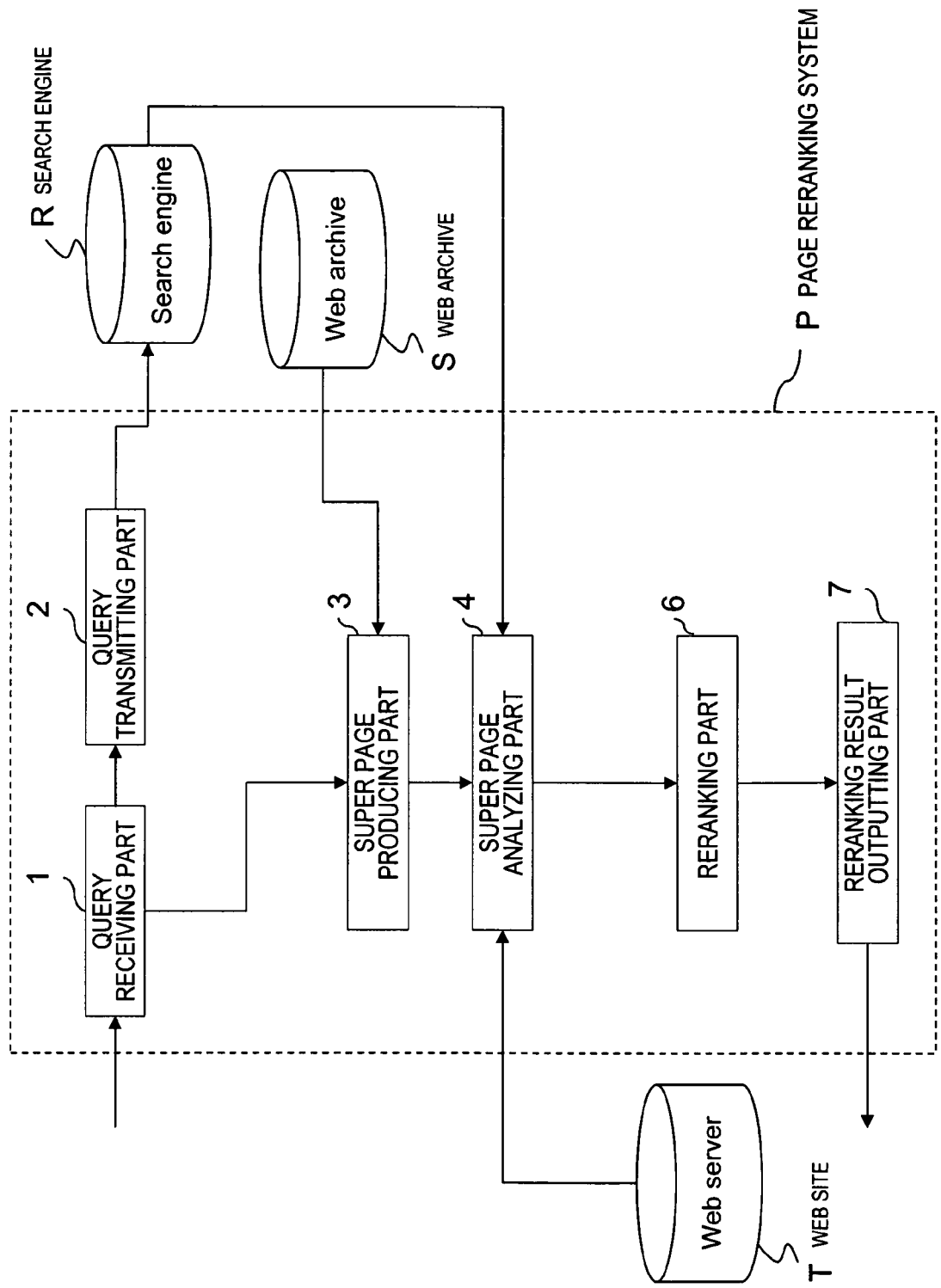
FIG. 6 is a configuration diagram of a page re-ranking system in accordance with another embodiment of this invention.

In addition, as shown in FIG. 6, the current page analyzing part may be omitted from the configuration shown in FIG. 3.

In addition, a set of Web archives can be used rather than only a single archive.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A page re-ranking system embedded in a memory and causing a processor to perform page re-ranking comprising:
   a super page producing part that produces a super page wherein existing page contents are combined between multiple versions of the existing page from each of multiple Web pages that are obtained as a search result page in compliance with a user's query on a topic and to which a page ranking is created;
   a super page analyzing part that analyzes a covering degree of a topic representation that describes the query on the topic or is most related to the query on the topic and is contained in each of the super pages produced by the super page producing part; and
   a re-ranking part that generates a renewed page ranking for each of the Web pages by comparing the analysis results obtained by the super page analyzing part between the super pages to provide a final ranking output.

2. The page re-ranking system described in claim 1, wherein
   the covering degree of the topic representation contained in the super page of one of the multiple Web pages is a similarity degree or a difference degree concerning the topic representation between the super pages of the multiple Web pages.

3. The page re-ranking system of claim 2, wherein
   the similarity degree between the super pages of the multiple Web pages is calculated by the following equation, $$HR_j = \sum_{i=1}^{W} \left[ \cos(VS_i, VS_j) * \left(1 + \varepsilon * \frac{W - R_i^{SE}}{W}\right) * \left(1 + \kappa * \frac{1}{Age_i}\right) \right]$$

where $HR_j$ is a historical similarity degree of a Web page j, cos is a cosine similarity, $VS_i$ is A vector of the super page of a Web page i, $VS_j$ is a vector of the super page of the Web page j, $R_i^{SE}$ is the search engine ranking of the Web page i, $\varepsilon$ and $\kappa$ are parameters, W is a total number of URLs as being an object to be re-ranked among a number of URLs of the search result obtained from the search engine, and $Age_i$ is an age of the Web page i.

4. The page re-ranking system of claim 2 wherein the similarity degree between the super pages is calculated using a historical similarity of a first Web page, and a cosine similarity of a vector of a super page of the first Web page and a vector of a super page of a second Web page.

5. The page re-ranking system of claim 1, and
   comprising a current page analyzing part that analyzes the covering degree of the topic representation that is contained in a current version of one of the multiple Web pages, wherein the re-ranking part generates a renewed page ranking for each of the multiple Web pages by comparing the analysis results obtained by the current page analyzing part between the current versions of the multiple Web pages.

6. The page re-ranking system of claim 5, wherein
   the covering degree of the topic representation that is contained in the current version of one of the multiple Web pages is a similarity degree or a difference degree concerning the topic representation between the current versions of the multiple Web pages.

7. The page re-ranking system of claim 6, wherein
   the similarity degree between the current versions of the multiple Web pages is calculated by the following equation, $$CR_j = \sum_{i=1}^{W} \left[ \cos(V_i, V_j) * \left(1 + \varepsilon * \frac{W - R_i^{SE}}{W}\right) \right]$$

where $CR_j$ is a current similarity degree of a Web page j, cos is a cosine similarity, $V_i$ is a vector of a current version of the Web page i, $V_j$ is a vector of a current version of the Web page j, $R_i^{SE}$ is a search engine ranking of the Web page i, $\varepsilon$ is a parameter, W is a total number of URLs as being an object to be re-ranked among a number of URLs of the search result obtained from the search engine.

8. The page re-ranking system of claim 6 wherein the similarity degree between the current versions of the multiple Web pages is calculated using a current similarity degree of a first Web page, and a cosine similarity of a vector of a current version of the first Web page and a vector of a current version of a second Web page.

9. The page re-ranking system of claim 1, wherein
the super page producing part produces the super pages by referring to a Web archive part that memorizes multiple versions of Web pages that existed on the Internet in the past.

10. The page re-ranking system of claim 1, wherein
the search result page is obtained by a searching process by a Web search engine.

11. A page re-ranking program stored on a computer-readable storage medium, said page ranking program when executed by a computer causes a processor to perform page ranking comprising:
  a super page producing part that produces a super page where page contents between multiple versions of each of multiple Web pages are combined for each of the multiple Web pages that are obtained as a search result page in compliance with a user's query on a topic and to which a page ranking is provided;
  a super page analyzing part that analyzes a covering degree of a topic representation that is contained in the super page produced by the super page producing part; and
  a re-ranking part that creates a renewed page ranking for each of the multiple Web pages by comparing the analysis results between the super pages obtained by the super page analyzing part to provide a final ranking output of the search results to the user.

12. A search system for ranking relevant information in response to a user's search of a topic on the Internet comprising;
  a computer communicating with an Internet, a search engine, and a Web archive storing Web pages;
  a user interface unit for entering a topic to be searched by the search engine on the Internet including the Web archive;
  means for storing Web pages found by the search engine in response to the user's topic;
  a super page producing part that produces a super page wherein existing Web page contents between multiple versions of an existing Web page from each of multiple Web pages are obtained as a search result page in compliance with the user's query on the topic and to which a page ranking is created for the individual Web pages;
  a super page analyzing part analyzes the covering degree of a topic representation that describes the query on the topic or is most related to the query on the topic and is contained in each of the super pages produced by the super page producing part; and
    a re-ranking part that creates a renewed page ranking for each of the multiple Web pages by comparing the analysis results obtained by the super page analyzing part between the super pages to provide a final ranking output to the user of the Web pages.

13. The search system described in claim 12, wherein
the covering degree of the topic representation contained in the super page of one of the multiple Web pages is a similarity degree or a difference degree concerning the topic representation between the super pages of the multiple Web pages.

14. The search system of claim 13, wherein
the similarity degree between the super pages of the multiple Web pages is calculated by the following equations $$HR_j = \sum_{i=1}^{W} \left[ \cos(VS_i, VS_j) * \left(1 + \varepsilon * \frac{W - R_i^{SE}}{W}\right) * \left(1 + \kappa * \frac{1}{Age_i}\right) \right]$$

where $HR_j$ is a historical similarity degree of a Web page j, cos is a cosine similarity, $VS_i$ is a vector of the super page of a Web page i, $VS_j$ is a vector of the super page of the Web page j, $R_i^{SE}$ is a search engine ranking of the Web page i, $\varepsilon$ and $\kappa$ are parameters, W is a total number of URLs as being an object to be re-ranked among a number of URLs of the search result obtained from the search engine, and $Age_i$ is an age of the Web page i.

15. The search system of claim 13, and
comprising a current page analyzing part that analyzes a covering degree of the topic representation that is contained in a current version of one of the multiple Web pages, wherein the re-ranking part generates a renewed page ranking to each of the multiple Web pages by comparing the analysis results obtained by the current page analyzing part between the current versions of the multiple Web pages.

16. The search system of claim 15, wherein
the covering degree of the topic representation that is contained in the current version of one of the multiple Web pages is a similarity degree or a difference degree concerning the topic representation between the current versions of the multiple Web pages.

17. The search system of claim 16, wherein
the similarity degree between the current versions of the multiple Web pages is calculated by the following equation, $$CR_j = \sum_{i=1}^{W} \left[ \cos(V_i, V_j) * \left(1 + \varepsilon * \frac{W - R_i^{SE}}{W}\right) \right]$$

where $CR_j$ is a current similarity degree of a Web page j, cos is a cosine similarity, $V_i$ is a vector of a current version of the Web page i, $V_j$ is a vector of a current version of the Web page j, $R_i^{SE}$ is the search engine ranking of the Web page i, $\varepsilon$ is the parameter, W is the total number of URLs as being an object to be re-ranked among the number of URLs of the search result obtained from the search engine.

18. The search system of claim 13, wherein
the super page producing part produces the super pages by referring to a Web archive part that memorizes multiple versions of Web pages that existed on the Internet in the past.

19. The search system of claim 13, wherein
the search result page is obtained by a searching process by a Web search engine.

* * * * *